United States Patent
Sears et al.

(10) Patent No.: US 12,512,027 B2
(45) Date of Patent: Dec. 30, 2025

(54) CONTRAST RATIO ADJUSTMENT IN MULTI-APPLICATION AUGMENTED REALITY ENVIRONMENT

(71) Applicant: Meta Platforms Technologies, LLC, Menlo Park, CA (US)

(72) Inventors: Jasmine Soria Sears, Portland, OR (US); Peter Lawrence Capak, Mountain View, CA (US); Devan Lippman, Happy Valley, OR (US); Yifei Li, Sammamish, WA (US); Jason Zink, Milford, MI (US); Nikolay Pakhomov, London (GB); James Powell, Pittsburgh, PA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/890,684

(22) Filed: Sep. 19, 2024

(65) Prior Publication Data
US 2025/0124832 A1    Apr. 17, 2025

Related U.S. Application Data

(60) Provisional application No. 63/544,293, filed on Oct. 16, 2023.

(51) Int. Cl.
*G09G 3/00* (2006.01)
*G02B 27/01* (2006.01)

(52) U.S. Cl.
CPC ......... *G09G 3/001* (2013.01); *G02B 27/0172* (2013.01); *G02B 2027/0118* (2013.01); *G09G 2320/0626* (2013.01); *G09G 2320/066* (2013.01); *G09G 2354/00* (2013.01); *G09G 2360/144* (2013.01)

(58) Field of Classification Search
CPC .......... G09G 3/001; G09G 2320/0626; G09G 2320/066; G09G 2354/00; G09G 2360/144; G02B 27/0172; G02B 2027/0118; G02B 2027/0138; G02B 2027/014
See application file for complete search history.

(56) References Cited

U.S. PATENT DOCUMENTS

| | | |
|---|---|---|
| 9,576,398 B1 | 2/2017 | Zehner et al. |
| 9,733,478 B2 | 8/2017 | Walsh |
| 10,477,115 B2 | 11/2019 | Xie et al. |
| 10,791,281 B1 | 9/2020 | Liao |
| 10,867,451 B2 | 12/2020 | Sears et al. |
| 11,423,621 B1 | 8/2022 | Atlas et al. |
| 11,435,580 B1 * | 9/2022 | Sneitzer ................ B64D 43/00 |

(Continued)

*Primary Examiner* — Brent D Castiaux
(74) *Attorney, Agent, or Firm* — Morgan, Lewis & Bockius LLP

(57) ABSTRACT

An apparatus, system, and method for contrast ratio adjustment in a multi-application augmented reality (AR) environment are described herein. In some aspects, methods include receiving first AR content and second AR content to be provided to a user of a head-mounted display. A combined target contrast ratio based at least in part on the first AR content and the second AR content is generated. The combined target contrast ratio is used to adjust a contrast ratio of the head-mounted display by adjusting a display brightness or adjusting a global dimming of a lens of the head-mounted display.

20 Claims, 5 Drawing Sheets

(56) References Cited

U.S. PATENT DOCUMENTS

2014/0184758 A1* 7/2014 Lee .................. H04N 13/395
                                                                 348/51
2018/0190019 A1* 7/2018 Glynn ............... H04L 67/131
2020/0111259 A1* 4/2020 Sears ................ G02B 27/0172

* cited by examiner

CONTRAST RATIO ADJUSTMENT IN MULTI-APPLICATION AUGMENTED REALITY ENVIRONMENT

CROSS-REFERENCE TO RELATED APPLICATIONS

This application claims the benefit of U.S. Provisional Application No. 63/544,293 filed Oct. 16, 2023, which is expressly incorporated herein by reference in its entirety.

TECHNICAL FIELD

This disclosure relates generally to Augmented Reality (AR), and in particular to content display in AR glasses or head-mounted displays (HMDs).

BACKGROUND INFORMATION

Augmented Reality (AR) enhances a user's view of the physical world with digital content, such as, e.g., text or images. For example, AR glasses or head-mounted displays (HMDs) may integrate AR directly into the user's field of view. Different factors may affect the viewing of the digital content or AR content, such as, e.g., display brightness or light conditions in the outside environment or world, e.g., world brightness.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
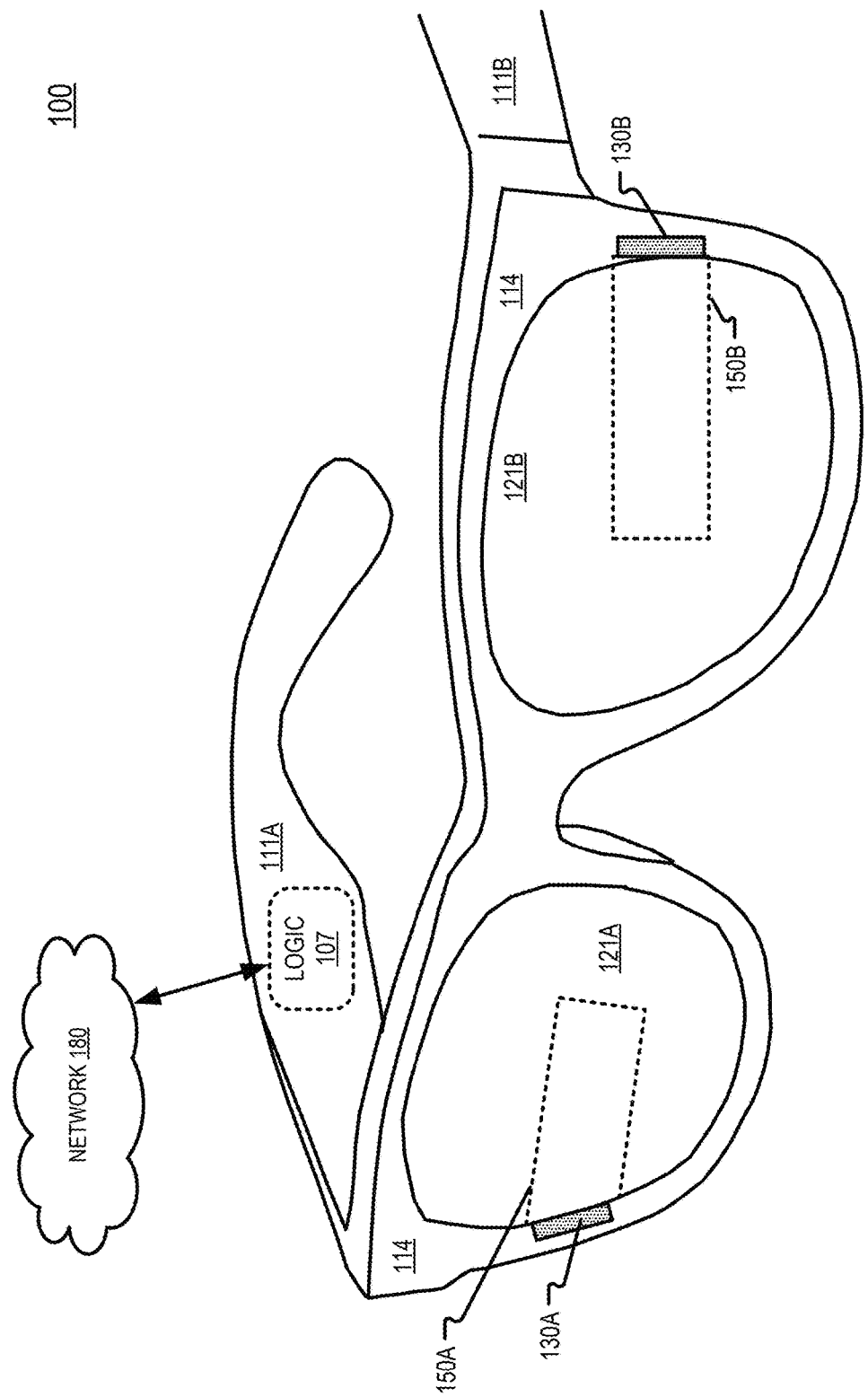
FIG. 1 illustrates a head-mounted display (HMD), in accordance with aspects of the present disclosure.

Embodiments of adjusting a contrast ratio of a head-mounted display in a multi-application augmented reality (AR) environment are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

Different types of AR content (e.g. icons and/or other visual images of designs, text, photos, people) require different additive contrast ratios (ratio of display brightness to world brightness) to achieve a suitable user experience. Currently, when global dimming is utilized, the entire glass lens of an AR headset will be at one transmission value, even though not all content requires the same transmission. In addition, some display architectures require the entire display to have a single white-point brightness, even if some content should be displayed with a different maximum brightness. Hence, it would be desirable to determine an appropriate display brightness and/or lens transmission value when multiple content pieces are being displayed simultaneously. Determining the appropriate display brightness may be particularly important when the different content is received from different applications in an AR processing environment.

In implementations of the disclosure, different augmented reality (AR) content is received. The different AR content may be received from different applications (a.k.a. "apps") in a processing environment of an AR headset. A combined target contrast ratio is generated based on the different AR content. A world brightness measurement of scene light is initiated in an ambient/world environment of the head-mounted display. In aspects, an auto-tinting factor is then generated in response to the world brightness measurement and the combined target contrast ratio. Finally, in aspects, a contrast ratio of the AR headset is adjusted in response to the auto-tinting factor. Adjustment of the contrast ratio includes adjustment of display brightness and/or adjustment of global dimming of lens(es) of the AR headset. These and other embodiments are described in more detail in connections with FIGS. 1-5.

FIG. 1 illustrates a head-mounted display (HMD) 100, in accordance with aspects of the present disclosure. HMD 100 includes frame 114 coupled to arms 111A and 111B. Lens assemblies 121A and 121B are mounted to frame 114. Lens assemblies 121A and 121B may include a prescription lens matched to a particular user of HMD 100. The illustrated HMD 100 is configured to be worn on or about a head of a wearer of HMD 100.

In the HMD 100 illustrated in FIG. 1, each lens assembly 121A/121B includes a display waveguide 150A/150B to direct image light generated by display projector assemblies 130A/130B to an eyebox region for viewing by a user of HMD 100. Display projector assemblies 130A/130B may include a beam-scanning display that includes a scanning mirror, for example. Display projector assemblies 130A/130B may include one or more light sources such as a red, green, and blue light source.

Lens assemblies 121A and 121B may appear transparent to a user to facilitate augmented reality or mixed reality to enable a user to view scene light from the environment around them while also receiving display light directed to their eye(s) by, for example, waveguides 150A/150B. Lens assemblies 121A and 121B may include two or more optical layers for different functionalities such as display, eye-tracking, face tracking, global dimming, and optical power. In some embodiments, display light from display projector assemblies 130A or 130B is only directed into one eye of the wearer of HMD 100. In an embodiment, both display projector assemblies 130A and 130B are used to direct image light into waveguides 150A and 150B, respectively.

Frame 114 and arms 111A/111B may include supporting hardware of HMD 100 such as processing logic 107, wired and/or wireless data interface for sending and receiving data, graphic processors, and one or more memories for storing data and computer-executable instructions. Processing logic 107 may include circuitry, logic, instructions stored in a machine-readable storage medium, ASIC circuitry, FPGA circuity, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Processing logic 107 is illustrated as included in arm 111A of HMD 100, although processing logic 107 may be disposed anywhere in the frame 114 or arms 111A/111B of HMD 100. Processing logic 107 may be communicatively coupled to wired or wireless network 180.

Figure 2:
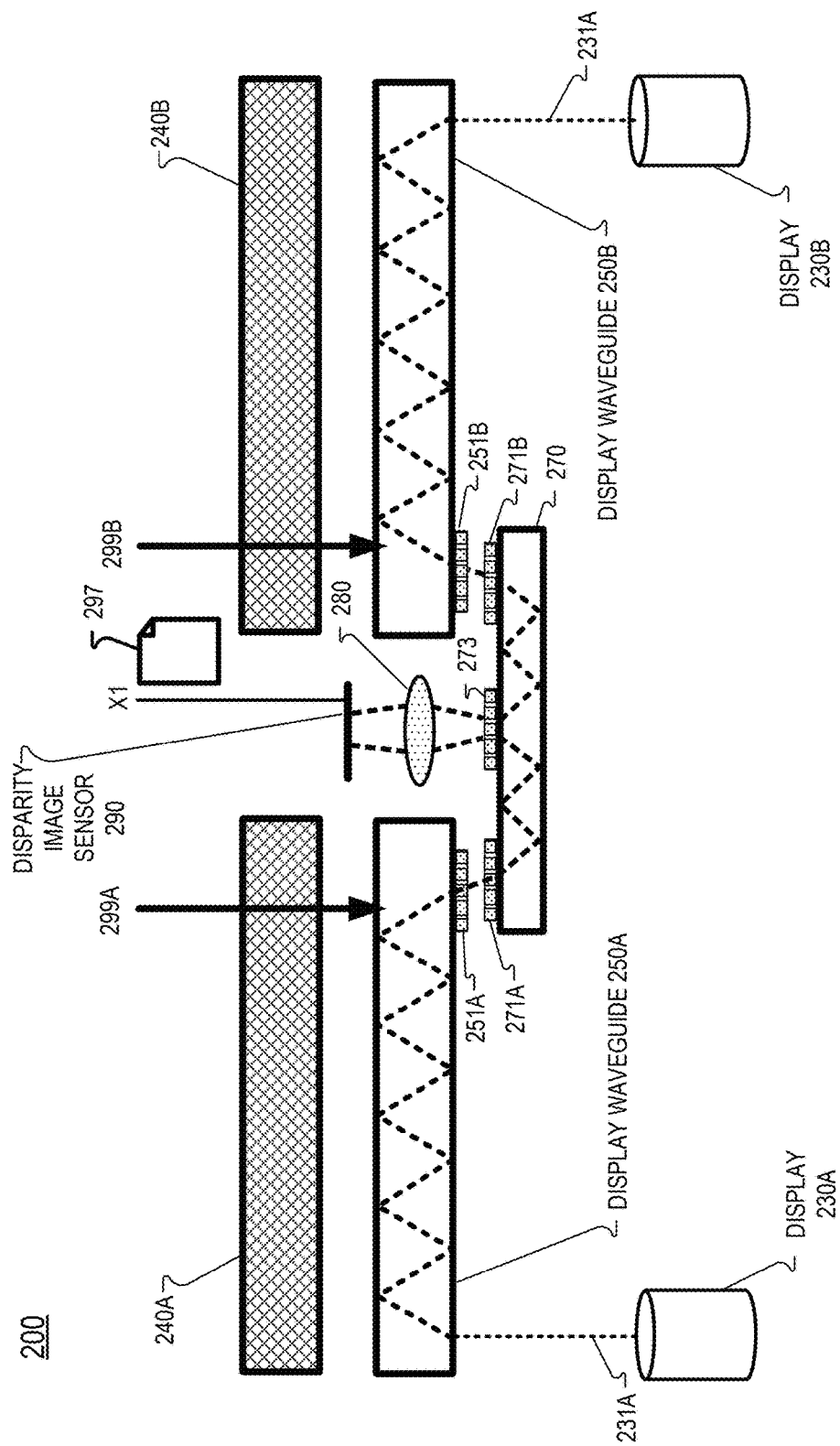
FIG. 2 illustrates an example electrical/optical system that may be included in the HMD of FIG. 1, in accordance with aspects of the disclosure.

FIG. 2 illustrates an example electrical/optical system 200 that may be included in a head-mounted display such as HMD 100, in accordance with aspects of the disclosure. System 200 includes two display waveguides 250A and 250B and a disparity image sensor 290 configured to receive a portion of the image light in display waveguide 250A and 250B by way of disparity waveguide 270. Other configurations of disparity image sensors are also contemplated.

Display 230A generates image light 231A to present virtual images to an eye of a user of a head-mounted display. Display 230B generates image light 231B to present virtual images to the other eye of a user of a head-mounted display.

In operation, an image is driven onto display 230A and display 230A generates image light 231A to direct into display waveguide 250A for presenting a virtual image to an eyebox region. The image light 231A may be confined to propagate within display waveguide 250A by way of total internal reflection (TIR) or otherwise. The image light is outcoupled (not specifically illustrated) from display waveguide 250A to present a virtual image to an eyebox region. An outcoupling element (not illustrated) such a grating or a holographic optical element (HOE) may be used to outcouple the image light to the eyebox region, for example.

In FIG. 2, at least a portion of the image light propagating in display waveguide 250A is outcoupled into disparity waveguide 270. Outcoupler 251A outcouples the image light from display waveguide 250A and incoupler 271A incouples the image light into disparity waveguide 270. The image light propagates in disparity waveguide 270 until it is outcoupled by outcoupler 273 where camera lens assembly 280 focuses the image light to an imaging plane of disparity image sensor 290. Disparity image sensor 290 captures an adjustment image 297 from the image light. Disparity image sensor 290 may include a complementary metal-oxide semiconductor (CMOS) image sensor, for example.

Disparity image sensor 290 also receives image light from a second display 230B and operates similarly to the display 230A on the left side of FIG. 2. In operation, an image is driven onto display 230B and display 230B generates image light 231B to direct into display waveguide 250B for presenting a virtual image to an eyebox region. The image light 231B may be confined to propagate within display waveguide 250B by way of total internal reflection (TIR) or otherwise. The image light is outcoupled (not specifically illustrated) from display waveguide 250B to present a virtual image to an eyebox region. An outcoupling element (not illustrated) such a grating or a holographic optical element (HOE) may be used to outcouple the image light to the eyebox region, for example.

In FIG. 2, at least a portion of the image light propagating in display waveguide 250B is outcoupled into disparity waveguide 270. Outcoupler 251B outcouples the image light from display waveguide 250B and incoupler 271B incouples the image light into disparity waveguide 270. The image light propagates in disparity waveguide 270 until it is outcoupled by outcoupler 273 where camera lens assembly 280 focuses the image light to an imaging plane of disparity image sensor 290.

The adjustment image 297 captured by disparity image sensor 290 may include a portion of the image light 231A from display waveguide 250A and a portion of the image light 231B from display waveguide 250B. In addition, disparity image sensor 290 may also capture a portion of scene light 299A that propagates through dimming layer 240A and into display waveguide 250A. Disparity image sensor 290 may also capture a portion of scene light 299B that propagates through dimming layer 240B and into display waveguide 250B. Dimming layers 240A and 240B are configured to dim scene light from the external environment. For example, the dimming layers may be driven by processing logic 107 to block 90% of scene light 299A/B in order to provide a suitable contrast ratio for displays 230A/B to present virtual images to a user of the head-mounted display 100.

Disparity image sensor 290 may be used to initiate a world brightness measurement since it is configured to receive at least a portion of scene light 299, in accordance with implementations of the disclosure. For example, the dimming level of dimming layers 240A/B may be accounted for to generate the world brightness measurement since the dimming level of dimming layers 240A/B will influence the portion of scene light 299A/B that becomes incident on disparity image sensor 290. Accordingly, disparity image sensor 290 may determine the world brightness measurement indirectly, eliminating the need for dedicated hardware to take the world brightness measurement.

Processing logic 107 may drive displays 230A/B to adjust their display brightness and/or adjust a global dimming level of dimming layers 240A/B in order to provide a suitable contrast ratio for virtual images, in some implementations of the disclosure.

Figure 3:
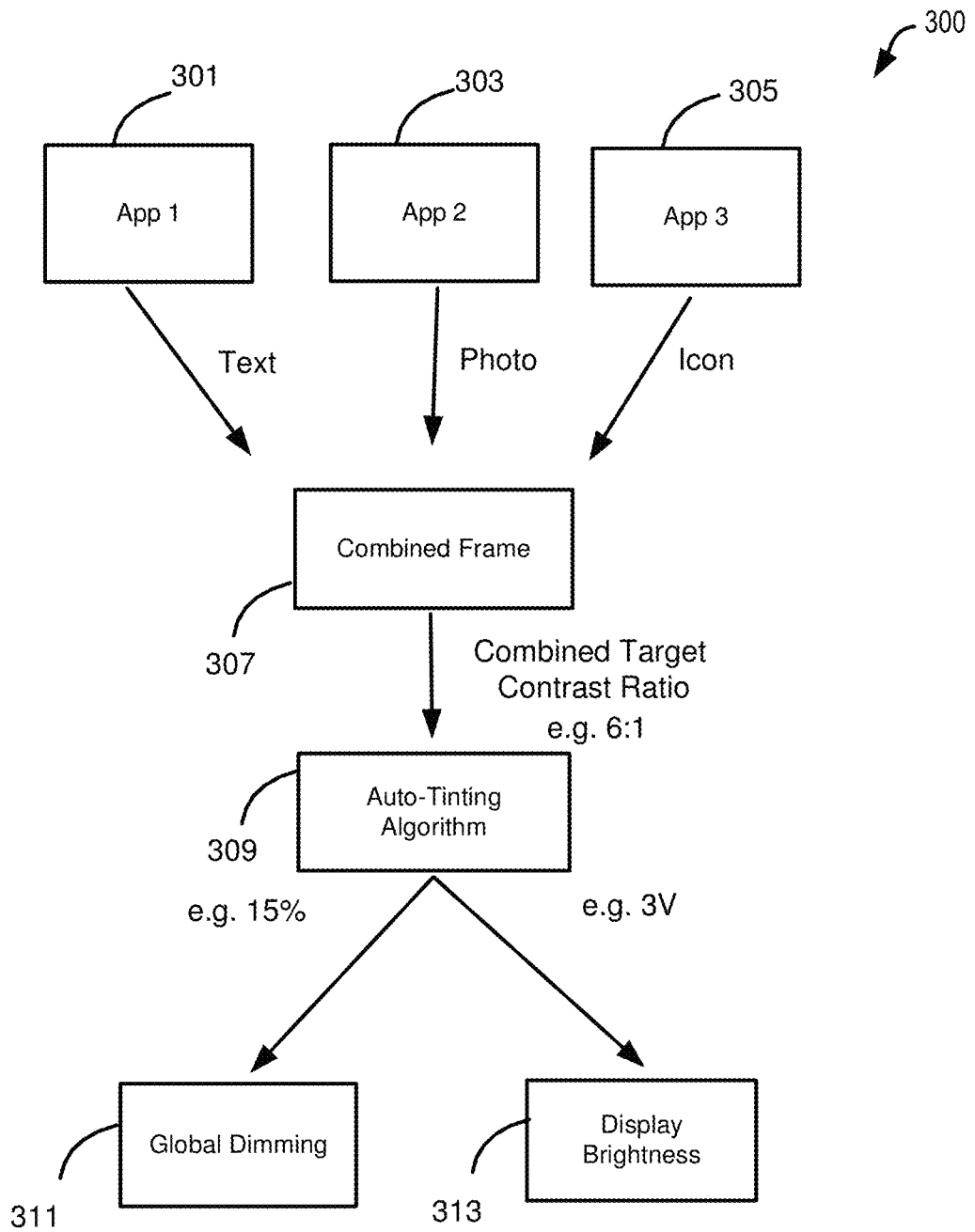
FIG. 3 illustrates a process flow for adjusting a contrast ratio of an HMD, in accordance with aspects of the disclosure.

Referring now to FIG. 3 which illustrates a process flow 300 for adjusting a contrast ratio of the head-mounted display (HMD), e.g., HMD 100 of FIG. 1, in response to receiving different AR content. Adjustment of the contrast ratio may include adjusting a display brightness of the displays 230A/B (FIG. 2) and/or adjusting a global dimming of the dimming layers 240A/B (FIG. 2). For example, as shown in FIG. 3, three applications (App 1, App 2, and App 3 of respective blocks 301, 303, and 305), provide AR content to a combined frame module or combined frame block 307. The AR content includes a type of content, e.g., one or more of text, a photo, icon (or other graphic design or image) that are to be shown simultaneously. Information about the content (e.g., text, photo, or icon or other graphic design or image) allows combined frame block 307 to generate a combined target contrast ratio based on the AR content and its type. In aspects, combined frame block 307 then provides the combined target contrast ratio (e.g., such as 6:1, further discussed with respect to FIG. 4) to an auto-tinting algorithm block or module ("auto-tinting block 309"). In aspects, auto-tinting block 309 receives a world brightness measurement as an input (discussed further below with respect to FIG. 4 and FIG. 5). Finally, in aspects, based on the combined target contrast ratio and the world brightness measurement, auto-tinting block 309 adjusts the contrast ratio of the HMD by adjusting global dimming at a block 311 (e.g., a dimming level representing 15% of total lens dimming) and/or adjusting display brightness at a block 313 (e.g., driving the display at 3V).

Figure 4:
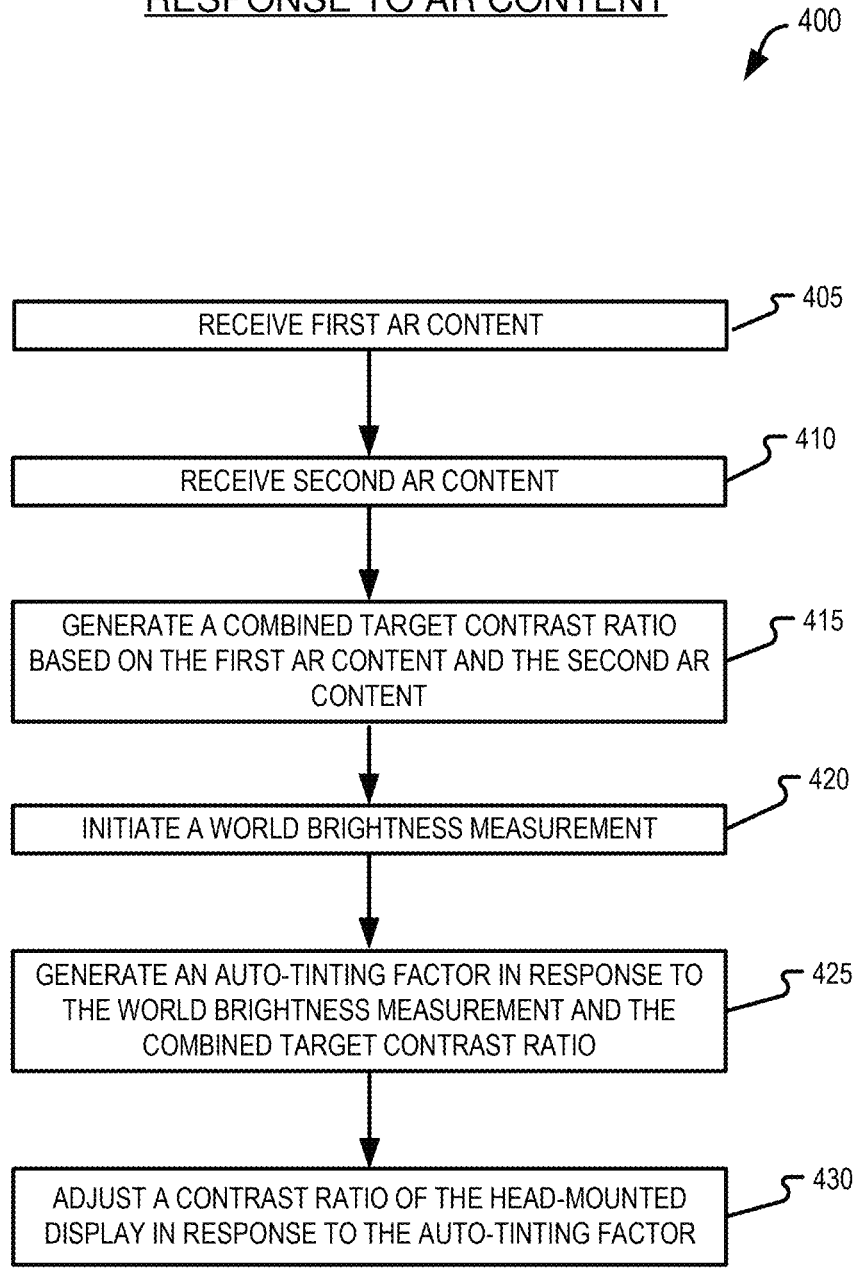
FIG. 4 is a flow chart of a process for adjusting a contrast ratio of an HMD, in accordance with aspects of the disclosure.

FIG. 4 illustrates a flow chart of a process 400 for adjusting a contrast ratio of an HMD in response to receiving various AR content, in accordance with aspects of the disclosure. In examples, logic 107 or FIG. 1 performs all or some of process 400.

In process block 405, first augmented reality (AR) content is received. The first AR content is to be provided to a user of an HMD as a virtual image. The first AR content may include text, an icon, or photo. In some examples, a photo or icon may include a photo or graphic image of a person/character/animal or other design. The first AR content may be received from a first application.

In process block 410, second AR content is received. The second AR content is also to be provided to a user of an HMD as a virtual image. Similar to the first AR content, the second AR content may include text, an icon or photo, such as, e.g., of a person/character/animal. The second AR content may be different or the same as the first AR content. The second AR content may be received from a second application that is different from the first application. In some aspects, the second AR content may be received from the first application.

In process block 415, a combined target contrast ratio is generated based on the first AR content and the second AR content. In an implementation, the combined target contrast ratio is the higher of a first target contrast ratio associated with the first AR content and a second target contrast ratio associated with the second AR content. By way of example, a photo or image of a person may have a target contrast ratio of six, whereas text may have a target contrast ratio of three. An icon for a company, for example, may have a target contrast ratio between 3.0 and 4.5. Thus, e.g., the combined target contrast ratio may be 6:1.

In process block 420, a world brightness measurement of an ambient/world light is initiated. The world brightness measurement may be performed by a photosensor and/or received as indirect information from devices performing various functions in the HMD.

In an implementation, the world brightness measurement of the ambient/world light is received from a Simultaneous Localization and Mapping (SLAM) camera of the head-mounted display. The world brightness measurement includes an Auto-Exposure Correction (AEC) setting of the SLAM camera, in some implementations.

In an implementation as discussed in connection with FIG. 2, the world brightness measurement of the ambient/world light is received from a disparity image sensor (e.g. disparity image sensor 290) of the head-mounted display. In an implementation, the head-mounted display includes a display layer (e.g. 250A/B) and a dimming layer (e.g. 240A/B) and the disparity image sensor is configured to receive scene light (e.g. 299) from a waveguide receiving scene light through the dimming layer.

In process block 425, an auto-tinting factor is generated in response to the world brightness measurement and the combined target contrast ratio.

Finally, in process block 430, a contrast ratio is adjusted in response to the auto-tinting factor. Adjusting the contrast ratio may include at least one of adjusting a display brightness (e.g. brightness of display light 231 of FIG. 2) or adjusting a global dimming (e.g. dimming of dimming layer 240A/B of FIG. 2) of a lens of the HMD.

In some implementations of process 400 (not shown), third AR content is received and the combined target contrast ratio is also generated based on the third AR content.

An implementation of process 400 may further include identifying, with an eye-tracking of the head-mounted display, a viewed content that a user is gazing at. The viewed content is the first AR content or the second AR content and the combined target contrast ratio is associated with the viewed content. By way of example, if a user is gazing at a person (AR content), the combined contrast ratio may be adjusted to six. If the user is gazing at text (AR content), the combined contrast ratio may be adjusted to three.

Note that the order in which some or all of the process blocks appear in FIG. 3 or FIG. 4 should not be deemed limiting. Rather, one of ordinary skill in the art having the benefit of the present disclosure will understand that some of the process blocks may be executed in a variety of orders not illustrated, or even in parallel.

Figure 5:
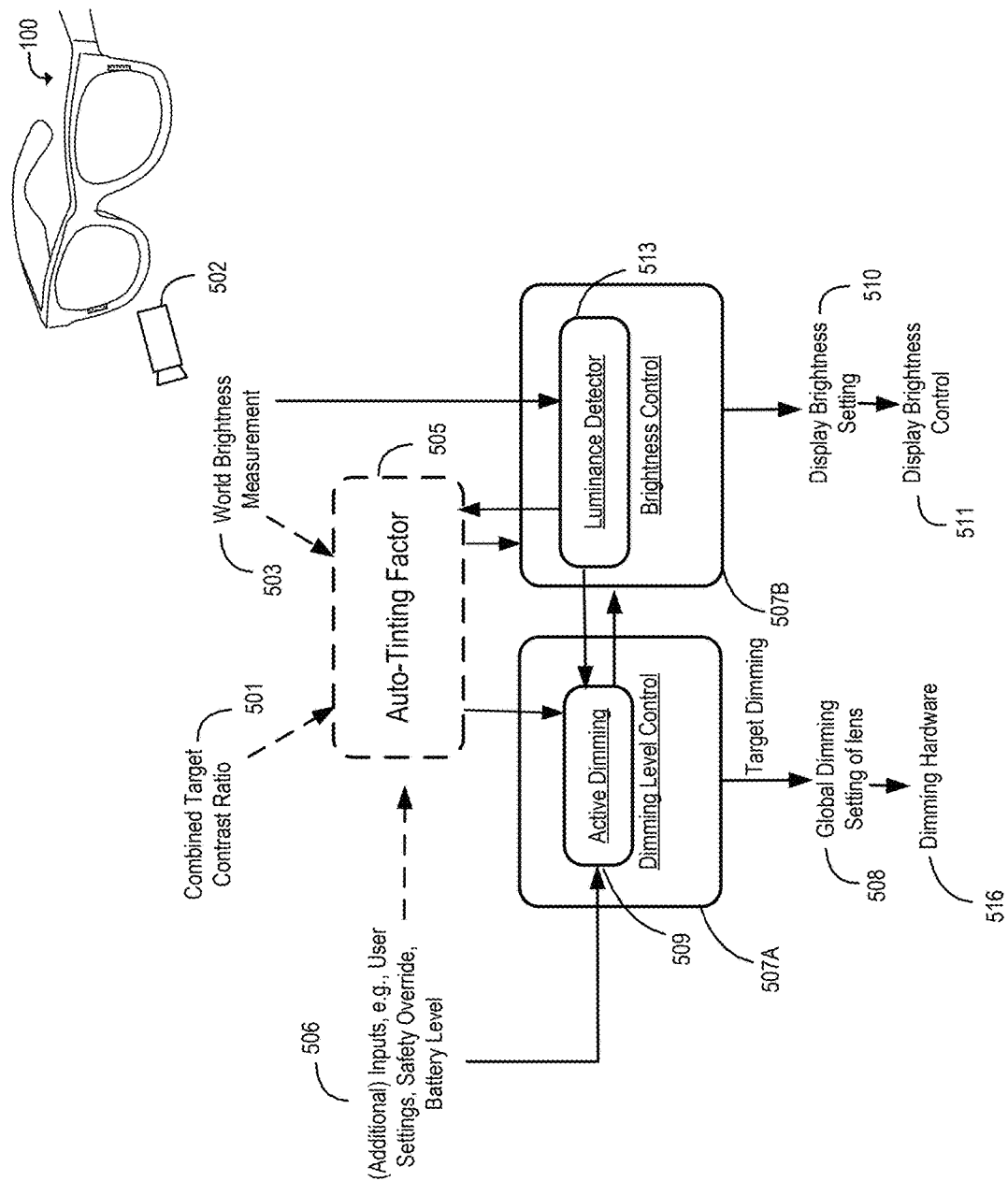
FIG. 5 illustrates an example environment in which the processes of FIG. 3 and FIG. 4, are implemented, in accordance with aspects of the disclosure.

FIG. 5 illustrates an example environment in which e.g., the processes of FIG. 3 and FIG. 4, are implemented, in accordance with aspects of the disclosure. As described earlier, a combined target contrast ratio 501 and a world brightness measurement 503 from a SLAM camera 502 (or other device such as a disparity image sensor or photodetector) are used to generate an auto-tinting factor (e.g., 505). Additional inputs 506 are also used to generate the auto-tinting factor, e.g., user settings or preferences, safety override (e.g., accounting for visibility in a dark space), or battery level or power conservation considerations. In some aspects, during generation of auto-tinting factor 505, each of additional inputs 506 (as well as combined target contrast ratio 501) are weighted according to priority. Note that in some cases, priority of one of one or more of additional inputs 506 may completely override use of combined target contrast ratio 501.

In FIG. 5, auto-tinting factor 505 is provided to dimming level control block 507A and brightness control block 507B. In aspects, dimming level control block 507A and brightness control block 507B respectively control a global dimming setting 508 and display brightness setting 510 of HMD 100 in accordance with auto-tinting factor 505. In aspects, dimming level control block 507A sends a global dimming setting 508 to dimming hardware 516 while brightness control block 507B provides a display brightness setting 510 to a display brightness control 511 of head-mounted display 100.

In various aspects, each of dimming level control block 507A and brightness control block 507B may include a microcontroller, however any suitable configuration of devices and/or control logic that includes hardware, software, or a combination of both that can suitably generate combined target contrast ratio 501 and provide dimming level control or brightness control in accordance with auto-tinting factor 505 to a head-mounted display is contemplated.

In some implementations, dimming level control block 507A includes an active dimming module or active dimming block 509 which may receive inputs such as, e.g., additional inputs 506, that may be used in generation of auto-tinting factor 505. In some implementations, brightness control 507B block includes a luminance detector 513 that receives world brightness measurement 503 which may be used in the determination of auto tinting factor 505.

In aspects, dedicated hardware to measure world brightness, which can take up limited space in an AR headset, is not needed if information indirectly generated by a disparity image sensor (e.g., disparity image sensor 290) or a front SLAM camera(s) (e.g., 502) is used to measure world brightness measurement 503. In implementations and as described previously, information such as, e.g., an automatic exposure correction (AEC) value or setting, from a SLAM camera can be used.

Embodiments of the invention may include or be implemented in conjunction with an AR system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 107) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
   receiving first augmented reality content to be provided to a user of a head-mounted display;
   receiving second augmented reality content to be provided to a user of the head-mounted display;
   generating a combined target contrast ratio based on the first augmented reality content and the second augmented reality content; and
   based at least in part on the combined target contrast ratio, adjusting a contrast ratio of the head-mounted display by at least one of adjusting a display brightness or adjusting a global dimming of a lens of the head-mounted display.

2. The method of claim 1, wherein adjusting the contrast ratio of the head-mounted display includes adjusting the contrast ratio in response to an auto-tinting factor and wherein the auto-tinting factor is generated by:
   initiating a world brightness measurement of scene light; and
   generating the auto-tinting factor in response to the world brightness measurement and the combined target contrast ratio.

3. The method of claim 2, wherein the world brightness measurement is received from a Simultaneous Localization and Mapping (SLAM) camera of the head-mounted display.

4. The method of claim 3, wherein the world brightness measurement includes an Auto-Exposure Correction (AEC) setting of the SLAM camera.

5. The method of claim 2, wherein the world brightness measurement is received from a disparity image sensor of the head-mounted display.

6. The method of claim 1, wherein the first augmented reality content includes at least one of text, an icon or other graphic design, or a person.

7. The method of claim 1, wherein the first augmented reality content includes text, and wherein the second augmented reality content includes an icon or other graphic design.

8. The method of claim 1, wherein the combined target contrast ratio is the higher of a first target contrast ratio associated with the first augmented reality content and a second target contrast ratio associated with the second augmented reality content.

9. The method of claim 1, wherein the first augmented reality content is from a first application of the head-mounted display, and wherein the second augmented reality content is from a second application of the head-mounted display.

10. The method of claim 1, wherein the head-mounted display includes a display layer and a dimming layer, and wherein a disparity image sensor is configured to receive light from a waveguide disposed between the display layer and the dimming layer.

11. The method of claim 1 further comprising:
    identifying, with an eye-tracking of the head-mounted display, a viewed content that the user is gazing at, wherein the viewed content is the first augmented reality content or the second augmented reality content, and wherein the combined target contrast ratio is associated with the viewed content.

12. The method of claim 1 further comprising:
    receiving third augmented reality content, wherein generating the combined target contrast ratio is also based on the third augmented reality content.

13. The method of claim 1, wherein the first augmented reality content and the second augmented reality content are to be presented simultaneously.

14. A head-mounted display comprising:
    a frame;
    a lens secured by the frame, wherein the lens includes a dimming layer;
    a photosensor configured to generate a world brightness measurement of scene light in an environment around the head-mounted display;
    a display for presenting virtual images to a user of the head-mounted display; and
    processing logic configured to:
       receive first augmented reality content;
       receive second augmented reality content;
       generate a combined target contrast ratio based on the first augmented reality content and the second augmented reality content; and
       based at least in part on the combined target contrast ratio, adjust a contrast ratio of the head-mounted display by at least one of adjusting a display brightness of the display or adjusting a global dimming of the dimming layer.

15. The head-mounted display of claim 14, wherein the contrast ratio of the head mounted display is adjusted in response to an auto-tinting factor and wherein prior to generating the combined target contrast ratio, the processing logic is configured to:
    initiate, with the photosensor, the world brightness measurement; and
    generate the auto-tinting factor in response to the world brightness measurement and the combined target contrast ratio.

16. The head-mounted display of claim 14, wherein the first augmented reality content includes at least one of text, an icon and/or other visual image.

17. A non-transitory machine-accessible storage medium that provides instructions that, when executed by processing logic, will cause the processing logic to perform operations comprising:
    receiving first augmented reality content and second augmented reality content to be provided to a user of a head-mounted display;
    generating a combined target contrast ratio based on the first augmented reality content and the second augmented reality content; and
    based at least in part on the combined target contrast ratio, adjusting a contrast ratio of the head-mounted display by adjusting a display brightness or a global dimming of a lens of the head-mounted display.

18. The non-transitory machine-accessible storage medium of claim 17, the non-transitory machine-accessible storage medium providing further instruction that will cause the processing logic to perform further operations comprising:
    prior to adjusting the contrast ratio of the head-mounted display:
       initiating a world brightness measurement;
       generating an auto-tinting factor in response to the world brightness measurement and the combined target contrast ratio, wherein adjusting the contrast ratio of the head-mounted display includes to adjust the contrast ratio in response to the auto-tinting factor.

19. The non-transitory machine-accessible storage medium of claim 17, wherein operations for generating the combined target contrast ratio include selecting a first target contrast ratio associated with the first augmented reality content that is higher than a second target contrast ratio associated with the second augmented reality content.

20. The non-transitory machine-accessible storage medium of claim 17, wherein operations to generate the combined target contrast ratio include determining the combined target contrast ratio based at least in part on a viewed content of the user.

* * * * *